(12) United States Patent
Yu

(10) Patent No.: US 11,297,516 B2
(45) Date of Patent: *Apr. 5, 2022

(54) REDUNDANT LINKS FOR RELIABLE COMMUNICATION

(71) Applicant: B&W Group Ltd., Worthing (GB)

(72) Inventor: Gaylord Yu, San Francisco, CA (US)

(73) Assignee: B&W Group Ltd., Worthing (GB)

( * ) Notice: Subject to any disclaimer, the term of this patent is extended or adjusted under 35 U.S.C. 154(b) by 15 days.

This patent is subject to a terminal disclaimer.

(21) Appl. No.: 16/859,338

(22) Filed: Apr. 27, 2020

(65) Prior Publication Data

US 2020/0260301 A1 Aug. 13, 2020

Related U.S. Application Data

(63) Continuation of application No. 16/221,558, filed on Dec. 16, 2018, now Pat. No. 10,638,338, which is a
(Continued)

(51) Int. Cl.
*H04W 76/18* (2018.01)
*H04W 24/04* (2009.01)
(Continued)

(52) U.S. Cl.
CPC .......... *H04W 24/04* (2013.01); *H04W 76/15* (2018.02); *H04W 76/18* (2018.02);
(Continued)

(58) Field of Classification Search
CPC ... H04W 24/04; H04W 76/027; H04W 88/06; H04W 88/08
See application file for complete search history.

(56) References Cited

U.S. PATENT DOCUMENTS

| 7,020,472 B2 | 3/2006 | Schmidt |
| 7,864,659 B2 | 1/2011 | Koo et al. |

(Continued)

FOREIGN PATENT DOCUMENTS

| EP | 1848120 A2 | 10/2007 |
| WO | 2013006593 A1 | 1/2013 |
| WO | 2016105472 A2 | 6/2016 |

OTHER PUBLICATIONS

International Search Report and Written Opinion for PCT/US2015/000195, dated Mar. 4, 2016.
(Continued)

*Primary Examiner* — Jamal Javaid
(74) *Attorney, Agent, or Firm* — Peter A. Nieves; Sheehan Phinney Bass & Green PA

(57) ABSTRACT

In order to maintain performance during wireless communication, a transmitting electronic device may concurrently and independently communicate redundant information to a receiving electronic device. In particular, information associated with a data stream may be communicated to the receiving electronic device using one or more channels by two radios using one or more wireless local area network communication protocols. The packets transmitted by the radios may preferentially include the same information. Moreover, the transmitting electronic device may attempt to maintain the redundant communication if a performance metric associated with the one or more channels degrades. For example, the transmitting electronic device may transfer communication to a different channel or may compress the information in the packets in the one or more channels if the throughput drops below a threshold value. Furthermore, the concurrent communication may allow the transmitting electronic device determine link quality without disrupting the communication of the information.

20 Claims, 5 Drawing Sheets

Related U.S. Application Data continuation of application No. 15/663,821, filed on Jul. 31, 2017, now Pat. No. 10,200,892, which is a continuation of application No. 14/544,343, filed on Dec. 24, 2014, now Pat. No. 9,763,120.

(51) Int. Cl.
| | | |
|---|---|---|
| *H04W 76/15* | (2018.01) | |
| *H04W 36/28* | (2009.01) | |
| *H04W 36/00* | (2009.01) | |
| *H04W 84/12* | (2009.01) | |

(52) U.S. Cl.
CPC ........ *H04W 36/0069* (2018.08); *H04W 36/28* (2013.01); *H04W 84/12* (2013.01)

(56) References Cited

U.S. PATENT DOCUMENTS

| | | | |
|---|---|---|---|
| 7,881,680 | B1 | 2/2011 | Viehweg et al. |
| 7,885,354 | B2 | 2/2011 | Perlman et al. |
| 8,300,563 | B2 | 10/2012 | Krishnaswamy et al. |
| 8,325,632 | B2 | 12/2012 | Gorbachov |
| 8,830,818 | B2 | 9/2014 | Damnjanovic |
| 8,839,065 | B2 | 9/2014 | Rajapakse |
| 8,848,639 | B2 | 9/2014 | Porat et al. |
| 9,635,649 | B1 | 4/2017 | Amiri et al. |
| 9,763,120 | B2 * | 9/2017 | Yu .................. H04W 76/15 |
| 10,200,892 | B2 * | 2/2019 | Yu .................. H04W 24/04 |
| 10,638,338 | B2 * | 4/2020 | Yu .................. H04W 76/15 |
| 2004/0032853 | A1 | 2/2004 | D'Amico et al. |
| 2005/0135517 | A1 | 6/2005 | Coffey et al. |
| 2006/0224763 | A1 | 10/2006 | Altunbasak et al. |
| 2009/0298435 | A1 | 12/2009 | Lee et al. |
| 2010/0166068 | A1 | 7/2010 | Perlman et al. |
| 2010/0246480 | A1 | 9/2010 | Aggarwal et al. |
| 2012/0045012 | A1 | 2/2012 | Alapuranen |
| 2013/0329680 | A1 | 12/2013 | Lee et al. |
| 2014/0185536 | A1 | 7/2014 | Lynn, Jr. et al. |
| 2014/0297799 | A1 | 10/2014 | Gordon et al. |

OTHER PUBLICATIONS

Jim Geier, "802.11 Beacons Revealed," Oct. 31, 2002, at http://www.wi-fiplanet.com/tutorials/article.php/1492071/802.11-Beacons-R- evealed.htm.

Lara Deek, et al., "The Impact of Channel Bonding on 802.11n Network Management," ACM CoNEXT 2011, Dec. 6-9, 2011, Tokyo, Japan, pp. 1-12.

M. Rentschler and P. Laukemann, "Towards a reliable parallel redundant WLAN back channel," 2012 9.sup.th IEEE International Workshop on Factory Communication Systems, Lemgo, 2012, pp. 255-264.

Pravin W. Raut and S.L. Badjate, "MIMO-Future Wireless Communication," International Journal of Innovative Technology and Exploring Engineering (IJITEE), vol. 2, Issue 5, Apr. 2013, pp. 102-106.

Pravin W. Raut and S.L. Badjate, "FPGA Based Design & Implementation of Alamouti MIMO Encoder for Wireless Transmitter," International Journal of Science and Modern Engineering (IJISME), vol. 1, Issue 9, Aug. 2013, pp. 13-16.

MOXA Connection, "Bulletproof Wireless Reliability with Redundant Links," Feb. 1, 2010, at http://www.moxa.com/newsletter/connection/2010/02/Redundant_Wireless_for_- heavy_industry.htm.

Office Action, U.S. Appl. No. 14/544,343, dated Aug. 12, 2016.

Response to Office Action, U.S. Appl. No. 14/544,343, dated Dec. 12, 2016.

Extended European Search Report, European Patent Application No. 15873764.3, dated Dec. 18, 2017.

Combined Search and Examination Report under Sections 17 and 18(3), GB Patent Application Serial No. GB1611328.4, dated Jan. 27, 2017.

EP Patent Application No. 15873764.3, Response to Extended European Search Report, dated Jul. 2, 2018.

U.S. Appl. No. 15/663,824, Non-Final Office Action, dated Feb. 28, 2018.

U.S. Appl. No. 15/663,824, Response to Non-Final Office Action, dated May 28, 2018.

Office Action, U.S. Appl. No. 14/544,343, dated Mar. 3, 2017.

Response to Office Action, U.S. Appl. No. 14/544,343, dated May 20, 2017.

Extended European Search Report for EP 20187009 dated Apr. 16, 2021.

\* cited by examiner

REDUNDANT LINKS FOR RELIABLE COMMUNICATION

CROSS-REFERENCE TO RELATED APPLICATION

This application claims priority under 35 U.S.C. 120 as a Continuation of U.S. patent application Ser. No. 16/221,558, entitled "Redundant Links for Reliable Communication," by Gaylord Yu, filed Dec. 16, 2018, as a Continuation of U.S. patent application Ser. No. 15/663,821, entitled "Redundant Links for Reliable Communication," by Gaylord Yu, filed Jul. 31, 2017 (now U.S. Pat. No. 10,200,892), and as a Continuation of U.S. patent application Ser. No. 14/544,343, entitled "Redundant Links for Reliable Communication," by Gaylord Yu, filed Dec. 24, 2014 (now U.S. Pat. No. 9,763,120), the contents of both of which are herein incorporated by reference.

This application is also related to: U.S. patent application Ser. No. 15/663,820, entitled "Redundant Links for Reliable Communication," by Gaylord Yu, filed on Jul. 31, 2017 (now U.S. Pat. No. 9,894,541); U.S. patent application Ser. No. 15/663,824, entitled "Redundant Links for Reliable Communication," by Gaylord Yu, filed on Jul. 31, 2017 (now U.S. Pat. No. 10,098,023); and U.S. patent application Ser. No. 15/663,828, entitled "Redundant Links for Reliable Communication," by Gaylord Yu, filed on Jul. 31, 2017 (now U.S. Pat. No. 9,891,932), the contents of which are herein incorporated by reference.

BACKGROUND

Field

The described embodiments relate to techniques for communicating information in a wireless network. In particular, the described embodiments relate to techniques for reliably communicating information between a transmitting electronic device and a receiving electronic device in a wireless network using redundant communication.

Related Art

Wireless communication is an increasingly popular technology for communicating information between electronic devices. In particular, these electronic devices may include networking subsystem that implement a network interface for a wireless local area network such as: a wireless network described in the Institute of Electrical and Electronics Engineers (IEEE) 802.11 standard, Bluetooth® (from the Bluetooth Special Interest Group of Kirkland, Wash.), and/or another type of wireless network.

However, the performance during wireless communication among electronic devices can vary significantly over time. For example, a proximate interference source can significantly degrade the performance. This decrease in performance can result in dropped packets or even a lost connection between a transmitting electronic device and a receiving electronic device. Consequently, variations in performance can result in reduced throughput, which can degrade the user experience when using the transmitting electronic device and/or the receiving electronic device.

SUMMARY

The described embodiments include a transmitting electronic device. This transmitting electronic device includes: an input port that receives information associated with a data stream; a first antenna; a second antenna; a first interface circuit coupled to the first antenna, and a second interface circuit coupled to the second antenna. Moreover, the first interface circuit may communicate first packets that include the information associated with the data stream from the transmitting electronic device to a receiving electronic device via a first channel using a wireless-local-area-network (WLAN) communication protocol. Furthermore, the second interface circuit may communicate second packets including the information associated with the data stream from the transmitting electronic device to the receiving electronic device via a second channel using the WLAN communication protocol, where the second channel may be different from the first channel, and the second packets are communicated from the transmitting electronic device to the receiving electronic device concurrently with the first packets. In addition, the transmitting electronic device may instruct the receiving electronic device to use the first channel during the communication of the first packets and to use the second channel during the communication of the second packets.

Note that the WLAN communication protocol may be compatible with an IEEE 802.11 standard. Moreover, the communication of the first packets via the first channel may be independent of the communication of the second packets via the second channel.

Furthermore, the first interface circuit may transfer communication of the first packets to a third channel when: a connection with the receiving electronic device associated with the first channel is lost; a performance metric associated with the communication via the first channel degrades below a first threshold value and/or a performance metric associated with the communication via the third channel exceeds the performance metric associated with the communication via the first channel. The concurrent communication of the second packets may ensure the information is communicated to the receiving electronic device without disruption during the transfer. Alternatively or additionally, the second interface circuit may transfer communication of the second packets to a fourth channel when: a connection with the receiving electronic device associated with the second channel is lost; a performance metric associated with the communication via the second channel degrades below a second threshold value and/or a performance metric associated with the communication via the fourth channel exceeds the performance metric associated with the communication via the second channel. In this case, the concurrent communication of the first packets may ensure the information is communicated to the receiving electronic device without disruption during the transfer. In either case, the transmitting electronic device may instruct or may communicate to the receiving electronic device to use or to switch to the third channel during communication of the first packets and to use or to switch to the fourth channel during the communication of the second packets.

Note that, when a connection with the receiving electronic device associated with the first channel is lost or a connection with the receiving electronic device associated with the second channel is lost, the remaining communication of the second packets or the first packets, respectively, ensures the information is communicated to the receiving electronic device without disruption and without further action by the transmitting electronic device.

In some embodiments, the transmitting electronic device compresses at least one of the information included in the first packets and the information included in the second packets when: the performance metric associated with the communication via the first channel degrades below the first threshold value; and/or the performance metric associated with the communication via the second channel degrades below the second threshold value. This compression may maintain approximately a common margin in the performance metric associated with the communication via the first channel and in the performance metric associated with the communication via the second channel.

Additionally, the transmitting electronic device may display a communication warning message and may selectively discontinue the redundant communication of the information via the first packets and the second packets when: the performance metric associated with the communication via the first channel is below the first threshold value; and/or the performance metric associated with the communication via the second channel is below the second threshold value.

Note that the transmitting electronic device may jointly encode the first packets and the second packets to provide information gain and/or error correction based on the concurrent communication.

Moreover, the transmitting electronic device may detect dropouts in the first packets and/or the second packets based on the concurrent communication.

Furthermore, during the communication of the information, the transmitting electronic device may perform channel estimation, determine link quality and/or perform channel calibration associated with the first channel and/or the second channel without disrupting the communication of the information. Additionally, during the communication of the information, the transmitting electronic device may dynamically perform spectral analysis of channels associated with the WLAN communication protocol using the first interface circuit and/or the second interface circuit without disrupting the communication of the information.

Another embodiment of the transmitting electronic device uses different WLAN communication protocols to communicate the first packets and the second packets. In these embodiments, the first channel may or may not be different than the second channel. Moreover, the second packets may or may not include all of the information (i.e., less than 100% redundancy may be used).

In another embodiment of the transmitting electronic device, the second packets may or may not include all of the information. In these embodiments, the first channel may or may not be different than the second channel. Moreover, the first interface circuit may or may not use the same WLAN communication protocol as the second interface circuit.

Another embodiment provides a computer-program product for use with the transmitting electronic device. This computer-program product includes instructions for at least some of the operations performed by the transmitting electronic device.

Another embodiment provides a method for communicating the information associated with the data stream from the transmitting electronic device to the receiving electronic device. This method includes at least some of the operations performed by the transmitting electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
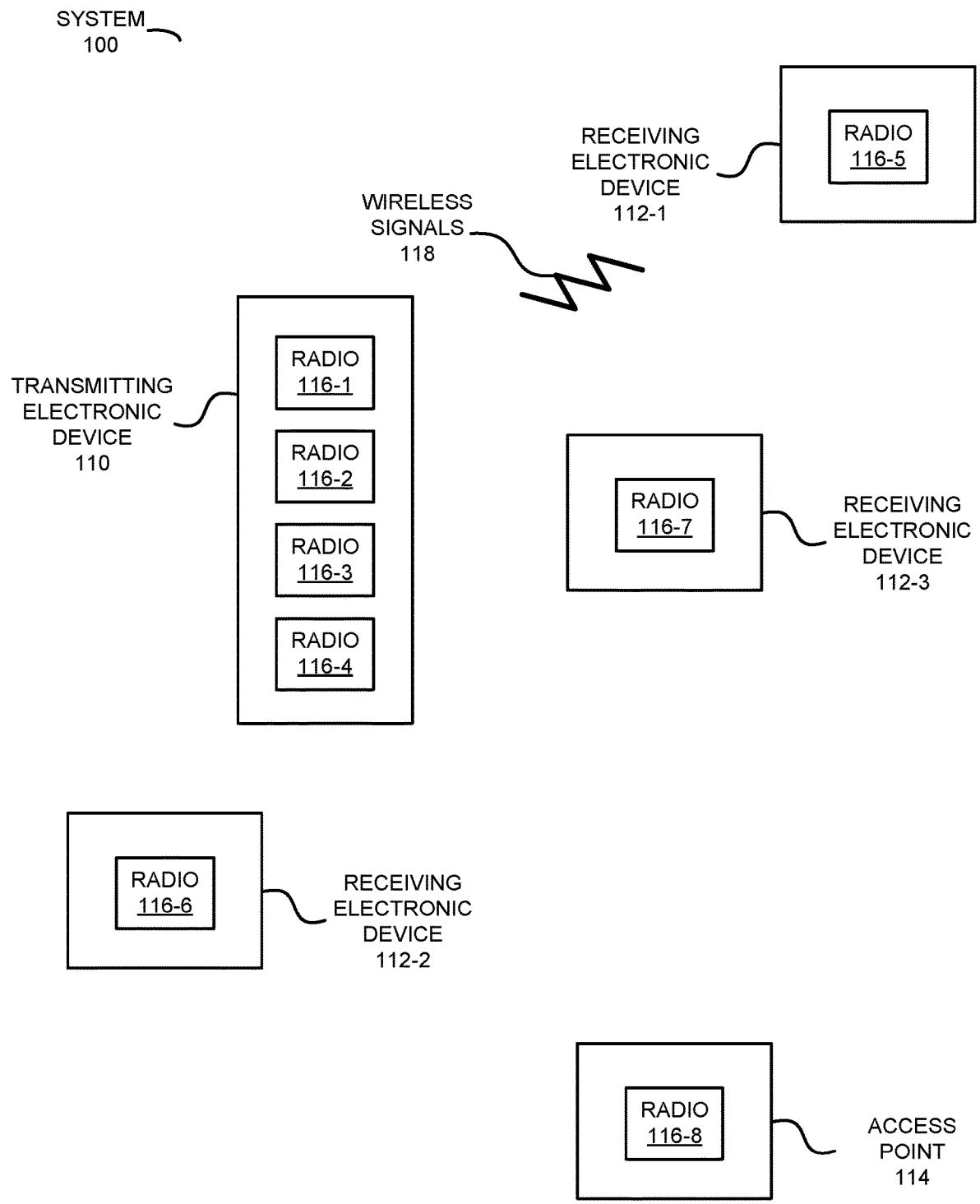
FIG. 1 is a block diagram illustrating a system with electronic devices wirelessly communicating in accordance with an embodiment of the present disclosure.

Table 1 provides radio use cases during communication among the electronic devices in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to maintain performance during wireless communication, a transmitting electronic device may concurrently and independently communicate redundant information to a receiving electronic device. In particular, information associated with a data stream may be communicated to the receiving electronic device using one or more channels by two radios using one or more wireless local area network (WLAN) communication protocols. This communication may involve coordination between the transmitting electronic device and the receiving electronic device about the channels to use during the communication, and may involve coordination between the radios about the channels to use during the communication and/or to compare received information. The packets transmitted by the radios may preferentially include the same information (i.e., the information conveyed via the one or more channels may be completely redundant). Moreover, the transmitting electronic device may attempt to maintain the redundant communication if a performance metric associated with the one or more channels degrades. For example, the transmitting electronic device may transfer communication to a different channel or may compress the information in the packets in the one or more channels if the throughput drops below a threshold value. Furthermore, the concurrent communication may allow the transmitting electronic device to perform channel estimation, determine link quality and/or perform channel calibration associated with the one or more channels without disrupting the communication of the information.

By communicating the redundant information, the transmitting electronic device may avoid or reduce the likelihood of dropped packets even if a connection between the transmitting electronic device and the receiving electronic device is lost. Consequently, the transmitting electronic device may maintain the throughput and, thus, may improve the user experience when using the transmitting electronic device and/or the receiving electronic device.

In the discussion that follows the transmitting and the receiving electronic devices include radios that communicate packets in accordance with one or more WLAN communication protocol, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), and/or another type of wireless interface. In the discussion that follows, Wi-Fi is used as an illustrative example. However, a wide variety of communication protocols may be used.

Communication among electronic devices is shown in FIG. 1, which presents a block diagram illustrating a system 100 with transmitting electronic device 110 and one or more receiving electronic devices 112 (such as consumer-electronic devices, e.g., a television, a set-top box, etc.) and an access point 114 (which provides a connection to a wired network, such as the Internet) wirelessly communicating according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 5:
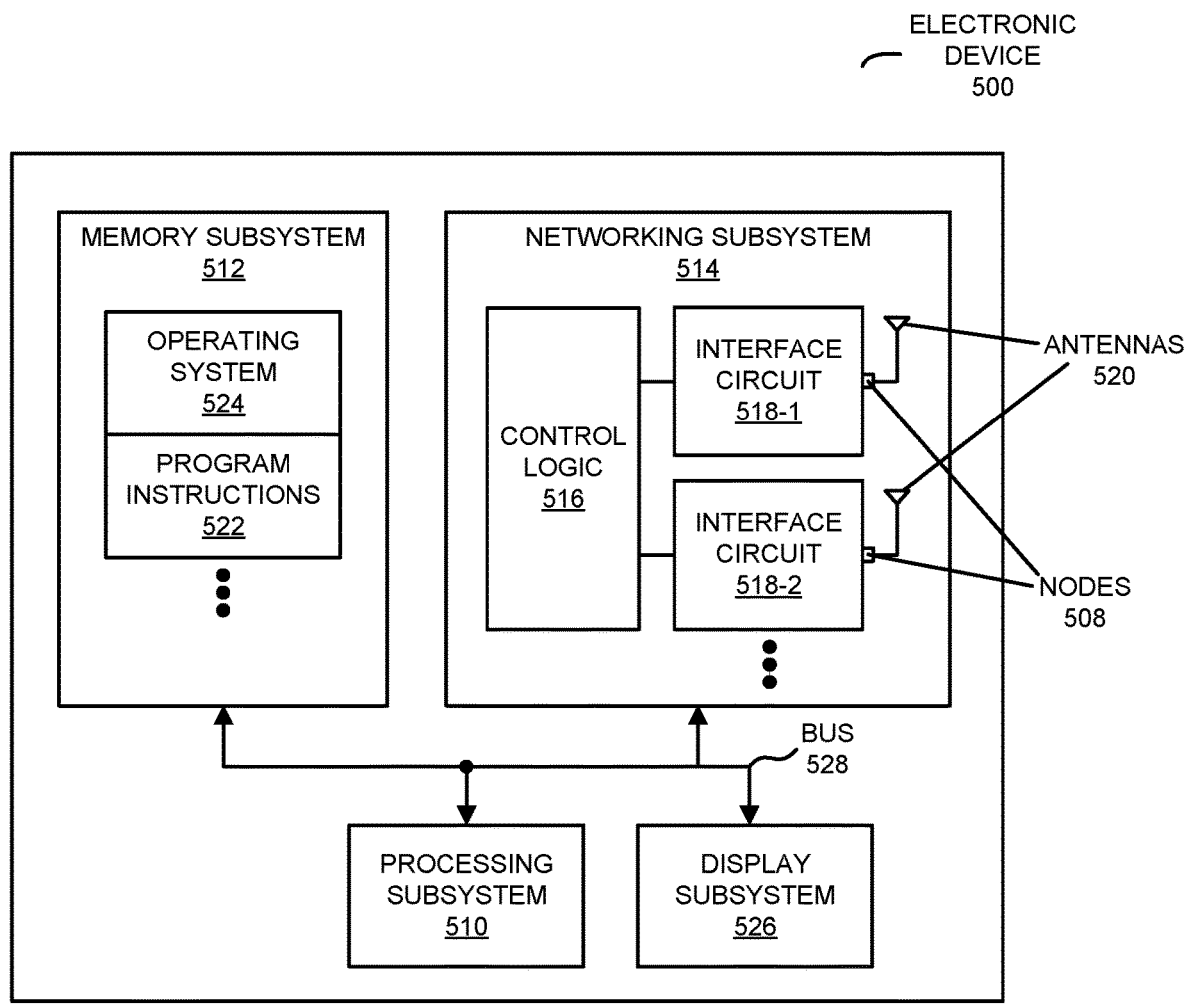
FIG. 5 is a block diagram illustrating one of the electronic devices of FIG. 1 in accordance with an embodiment of the present disclosure.

As described further below with reference to FIG. 5, transmitting electronic device 110, the one or more receiving electronic devices 112 and access point 114 may include subsystems, such as: a networking subsystem, a memory subsystem and a processor subsystem. In addition, transmitting electronic device 110, the one or more receiving electronic devices 112 and access point 114 may include radios 116 in the networking subsystems. (Note that radios 116 may be instances of the same radio or may be different from each other.) More generally, transmitting electronic device 110, the one or more receiving electronic devices 112 and access point 114 can include (or can be included within) any electronic devices with the networking subsystems that enable transmitting electronic device 110, the one or more receiving electronic devices 112 and access point 114 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 118 (represented by a jagged line) are transmitted from a radio 116-1 in transmitting electronic device 110. These wireless signals 118 are received by at least one of the one or more receiving electronic devices 112 and/or access point 114 (such as receiving electronic device 112-1). In particular, transmitting electronic device 110 may transmit packets. In turn, these packets may be received by radios 116 (such as radio 116-5) in at least the one of the one or more receiving electronic devices 112 and/or access point 114. This may allow transmitting electronic device 110 to communicate information to receiving electronic devices 112 and/or access point 114. While FIG. 1 illustrates transmitting electronic device 110 transmitting packets, note that transmitting electronic device 110 may also receive packets from the one or more receiving electronic devices 112 and/or access point 114.

In the described embodiments, processing of a packet or frame in transmitting electronic device 110, the one or more receiving electronic devices 112 and/or access point 114 includes: receiving wireless signals 118 with the packet or frame; decoding/extracting the packet or frame from received wireless signals 118 to acquire the packet or frame; and processing the packet or frame to determine information contained in the packet or frame (such as the information associated with the data stream). For example, the information may include audio and video that are displayed on at least one of receiving electronic devices 112 or a display (such as a television) coupled to at least the one of receiving electronic devices 112. Note that the communication between transmitting electronic device 110 and a given one of receiving electronic devices 112 and/or access point 114 (such as receiving electronic device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization'). Moreover, the performance during the communication associated with different channels may be monitored individually or, as described further below, jointly (e.g., to identify dropped packets).

However, performance during the communication may change, e.g., there may be a transient interference source (such as a microwave oven) in proximity, too many receiving electronic devices 112 associated with transmitting electronic device 110, the amount of information that transmitting electronic device 110 needs to communicate with the one or more receiving electronic devices 112 may exceed the capacity, there may be movement, and/or there may be another factor that may affects the performance. This may result in a degradation in the performance (or even a lost connection between transmitting electronic device 110 and the one or more receiving electronic devices 112), which, in turn, may increase the number of packets that are resent and, thus, may increase the latency of the communication and may degrade the experience of user(s) of receiving electronic devices 112. For example, the quality of video streamed to a television may degrade or there may be a pause in the video.

In order to address this problem, transmitting electronic device 110 may implement a communication technique (which is described further below with reference to FIGS. 2-4) in which information is redundantly communicated between transmitting electronic device 110 and a given one of receiving electronic devices 112 (such as receiving electronic device 112-1). In particular, two radios in transmitting electronic device 110 (such as radios 116-1 and 116-2) may establish connections or links with receiving electronic device 112-1. These links may each have a separate or different service set identifier on a wireless network (which may be a proprietary network) associated with transmitting electronic device 110 and receiving electronic device 112-1.

(If the network is a proprietary network, these service set identifiers may not be broadcast to an arbitrary receiving electronic device or a receiving electronic device outside of the proprietary network.) Then, radios 116-1 and 116-2 may communicate information associated with a data stream (such as audio, video and, more generally, data) to receiving electronic device 112-1 using one or more channels in the connections and one or more Wi-Fi communication protocols. (Note that the one or more channels may be identified by radios 116-1 and 116-2 by performing channel calibration and determining one or more associated performance metrics when transmitting electronic device 110 is powered on. Channel information specifying the one or more channels that will be used during the communication of the packets may be provided by transmitting electronic device 110 to receiving electronic device 112-1. Thus, transmitting electronic device 110 may instruct receiving electronic device 112-1 which channels to use. In addition, relative performance information about the remaining channels may be stored and, as described below, may be used to guide channel transitions.) The packets transmitted by radios 116-1 and 116-2 in the one or more channels may preferentially include the same information, i.e., the information conveyed via the one or more channels may be completely redundant as long as the conditions in the wireless environment permit. For example, radio 116-1 may transmit packets with the information in a channel to receiving electronic device 112-1 using a Wi-Fi communication protocol (such as IEEE 802.11b or 802.11n), and radio 116-2 may concurrently transmit additional packets with the same information in another channel (i.e., a different channel having a different carrier frequency) to receiving electronic device 112-1 using the Wi-Fi communication protocol. (However, as described further below, in other embodiments radio 116-2 transmits the additional packets with only some of the same information, such as at least a majority of the information, e.g., at least 50% of the information. Furthermore, in some embodiments radio 116-2 transmits the additional packets in the same channel as radio 116-2 and/or uses a different Wi-Fi communication protocol as radio 116-1.) Such concurrent communication on particular channels is not be possible with the Wi-Fi communication protocol without coordination between transmitting electronic device 110 and receiving electronic device 112-1 (as is the case in the disclosed communication technique). Note that the communication of the packets by radio 116-1 in the channel may be independent of the communication of the additional packets in the other channel by radio 116-2.

Moreover, note that, when a connection with receiving electronic device 112-1 associated with the channel is lost or a connection with receiving electronic device 112-2 associated with the other channel is lost, the remaining communication of the additional packets or the packets, respectively, ensures the information (or at least a majority of the information) is communicated to receiving electronic device 112-1 without disruption and without further action by transmitting electronic device 110.

However, transmitting electronic device 110 may attempt to maintain the redundant communication of the information if one or more performance metrics associated with the one or more channels degrade. For example, radio 116-1 may transfer communication of the packets to a third channel (which is other than the channel used by radio 116-1 or the other channel used by radio 116-2) when: a connection with receiving electronic device 112-1 associated with the channel is lost; and/or a performance metric associated with the communication via the channel degrades below a threshold value. For example, the performance metric may be throughput, and radio 116-1 may transfer or handoff the communication when the throughput drops below a minimum or threshold value (such as 35 Mbps) that ensures quality video playback on receiving electronic device 112-1. Alternatively, radio 116-1 may transfer the communication when the throughput drops below the previously characterized performance metric of an available channel. The concurrent (and redundant) communication of the packets by radio 116-2 may ensure the information is communicated to receiving electronic device 112-1 without disruption during the transfer by radio 116-1. Similarly, radio 116-2 may transfer communication of the packets to a fourth channel (which is other than the other channel used by radio 116-2, or the channel or the third channel used by radio 116-1) when: a connection with receiving electronic device 112-1 associated with the other channel is lost; and/or a performance metric associated with the communication via the other channel degrades below another threshold value (which may be the same or different than the threshold value associated with the performance metric for the connection used by radio 116-1). Once again, the concurrent (and redundant) communication of the packets by radio 116-1 may ensure the information is communicated to receiving electronic device 112-1 without disruption during the transfer by radio 116-2. Thus, the concurrent communication may allow seamless (i.e., without delay) handoff of the communication of the packets while radios 116-1 and 116-2 use one or more Wi-Fi communication protocols. (Note that the channel handoffs may not require re-authentication or use of Dynamic Host Configuration Protocol.) Furthermore, because the communication of the packets by radios 116-1 and 116-2 may be independent of each other, the handoffs by these radios may occur independently of each other. (In some embodiments, note that radio 116-1 transfers the communication to the third channel when a performance metric associated with the communication via the third channel exceeds the performance metric associated with the communication via the first channel. Similarly, radio 116-2 may transfer the communication the fourth channel when a performance metric associated with the communication via the fourth channel exceeds the performance metric associated with the communication via the second channel. These transfers may be based on predefined characterization of the channels and/or, as described further below, a dynamic quality assessment of the communication.)

Note that, prior to a handoff (or transfer or switching) from the first channel or the second channel, transmitting electronic device 110 may instruct or provide channel information to receiving electronic device 112-1 specifying the third channel or the fourth channel. Thus, there may be coordination between transmitting electronic device 110 and receiving electronic device 112-1 (as opposed to transmitting electronic device 110 performing a hop and receiving electronic device 112-1 subsequently performing a scan to find the new channel to reacquire a connection with transmitting electronic device 110). In addition, there may be coordination between radios 116-1, 116-2, 116-3 and 116-4 so that these radios can avoid using the same channel (if possible), which otherwise would degrade the ability to redundantly communicate the information.

Alternatively or additionally (such as when there is no better available channel to transition to), transmitting electronic device 110 may compresses the information included in the packets transmitted by radio 116-1 and/or the information included in the packets transmitted by radio 116-2. Thus, compression may be used in either or both of the connections between transmitting electronic device 110 and receiving electronic device 112-1. This compression may occur when: the performance metric associated with the communication via the channel degrades below the threshold value; and/or the performance metric associated with the communication via the other channel degrades below the other threshold value. The compression may maintain approximately a common margin in the performance metric associated with the communication via the channel and in the performance metric associated with the communication via the other channel. For example, common margin may be 10-30% above a minimum throughput, such as 35 Mbps. Note that the same or a different compression technique may be used for the information in packets in the channel and the information in packets in the other channel. Moreover, the compression technique(s) may be lossless or lossy. In particular, initially the compression technique may be lossless, but if the degradation becomes too significant a lossy compression technique may be used (such as transmitting every other packet or only transmitting I-frames in MPEG video). Thus, transmitting electronic device 110 may attempt to seamlessly and gracefully degrade the redundant communication as the degradation increases.

Furthermore, transmitting electronic device 110 may encode the information in the packets transmitted by radios 116-1 and 116-2. The encoding used for the packets transmitted by radios 116-1 and 116-2 may be the same or different. For example, depending on the conditions in the wireless environment (such as the performance metrics associated with the channel and the other channel), a different modulation coding scheme index value may be used by radio 116-1 than radio 116-2. In some embodiments, transmitting electronic device 110 jointly encodes the packets communicated by radio 116-1 and the packets communicated by radio 116-2 to provide (coding) information gain and/or error correction based on the concurrent communication by radios 116-1 and 116-2. Thus, in some embodiments the packets communicated by radios 116-1 and 116-2 may be encoded as if they were communicated in a single channel (even if more than one channel is used during the communication between transmitting electronic device 110 and receiving electronic device 112-1).

While transmitting electronic device 110 may attempt to maintain the redundant communication of the information when one or more performance metrics associated with the one or more channels degrade, if the degradation is severe enough (such as when a performance metric for one of the channel and the other channel is below the threshold value) this may no longer be possible. If this occurs, transmitting electronic device 110 may display a communication warning message to a user of receiving electronic device 112-1 (which may explain the degradation in the performance and/or may suggest a remedial action), and may selectively discontinue the redundant communication of the information communicated via the packets by radio 116-1 and communicated via the packets by radio 116-2. In particular, the redundant communication may be selectively discontinued when: the performance metric associated with the communication via the channel is below the threshold value; and/or the performance metric associated with the communication via the other channel is below the other threshold value. Note that the selective discontinued redundant communication may be applied to all the packets transmitted by radio 116-1 or radio 116-2, or may be applied dynamically on a packet-by-packet basis.

In addition to providing robust communication in a dynamic wireless environment, the concurrent communication by radios 116-1 and 116-2 may facilitate additional monitoring and quality-of-service (QoS) characterization, which may allow the best available channels at a given time to be identified. For example, transmitting electronic device 110 may detect dropouts in the packets communicated by radio 116-1 and/or the packets communicated by radio 116-2 by comparing feedback (such as acknowledgment messages) from receiving electronic device 112-1 about the received packets. (Alternatively or additionally, errors may be detected via coordination between radios 116-1 and 116-2, such as comparisons of received payloads in packets.) Thus, if there is currently 100% redundancy in the channel and the other channel, and packets A, B, C and D transmitted by radio 116-1 are received, while only packets B and D transmitted by radio 116-2 are received, transmitting electronic device 110 may conclude that packets A and C were dropped during communication by radio 112-2. This capability, as well as the one or more QoS characterization techniques described below, may allow continuous channel monitoring of the throughput, which may enable transitions to different channels that have improved performance (such as one with a performance metric that exceeds the threshold value and a current performance metric associated with the communication via a channel associated with a current connection).

Figure 3:
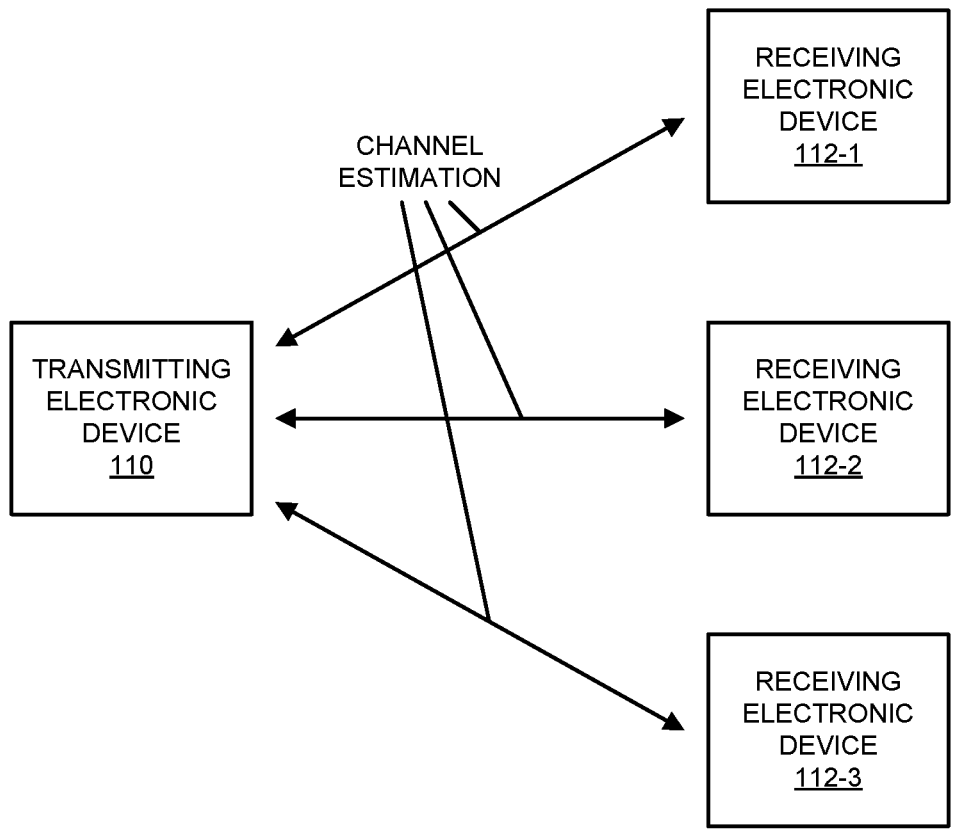
FIG. 3 is a drawing illustrating performing channel estimation during communication among the electronic devices in FIG. 1 in accordance with an embodiment of the present disclosure.

Furthermore, as described further below with reference to FIG. 3, the concurrent communication may allow transmitting electronic device 110 to perform at least one of the one or more QoS characterization techniques, such as performing channel estimation, determining link quality, performing channel calibration and/or performing spectral analysis associated with at least the channel and/or the other channel without disrupting the communication of the information. (Alternatively, transmitting electronic device 110 may perform at least one of these QoS characterization techniques on the channels associated with a Wi-Fi communication protocol.) For example, during the communication of the information between transmitting electronic device 110 and receiving electronic device 112-1, one of radios 116-1 and 116-2 (such as the radio with the higher value of a performance metric, e.g., a higher throughput and, thus, increased margin) may briefly stop transmitting packets and may perform a full (channel-by-channel) scan of the channels associated with a Wi-Fi communication protocol. Then, the spectral analysis may be performed by using a Discrete Fourier Transform (DFT) or a Fast Fourier Transform (FFT) to calculate the spectrum and/or a power spectral density. Alternatively, one of radios 116-1 and 116-2 may perform the channel estimation, determine the link quality, perform the channel calibration and/or perform the spectral analysis during a time interval or gap between transmissions of packets. This QoS characterization of the channels may be possible during the communication of the information and in a way that is still compatible with the Wi-Fi communication protocol (even though such QoS characterization is not included in the existing IEEE 802.11 standards) because a provider of system 100 illustrated in FIG. 1 (which implements the communication technique) may have control over transmitting electronic device 110 and receiving electronic device 112-1. In particular, the provider may coordinate the communication between these electronic devices when the QoS characterization is performed. (Thus, the QoS characterization may occur without requiring that transmitting electronic device 110 drop or teardown a connection with receiving electronic device 112-1 via the first channel or the second channel.) Note that the QoS characterization may be performed in real-time, such as at least once per second with the data stream is transmitted.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While receiving electronic devices 112 are illustrated with a single instance of radios 116, in other embodiments receiving electronic devices 112 may include multiple radios.

Figure 2:
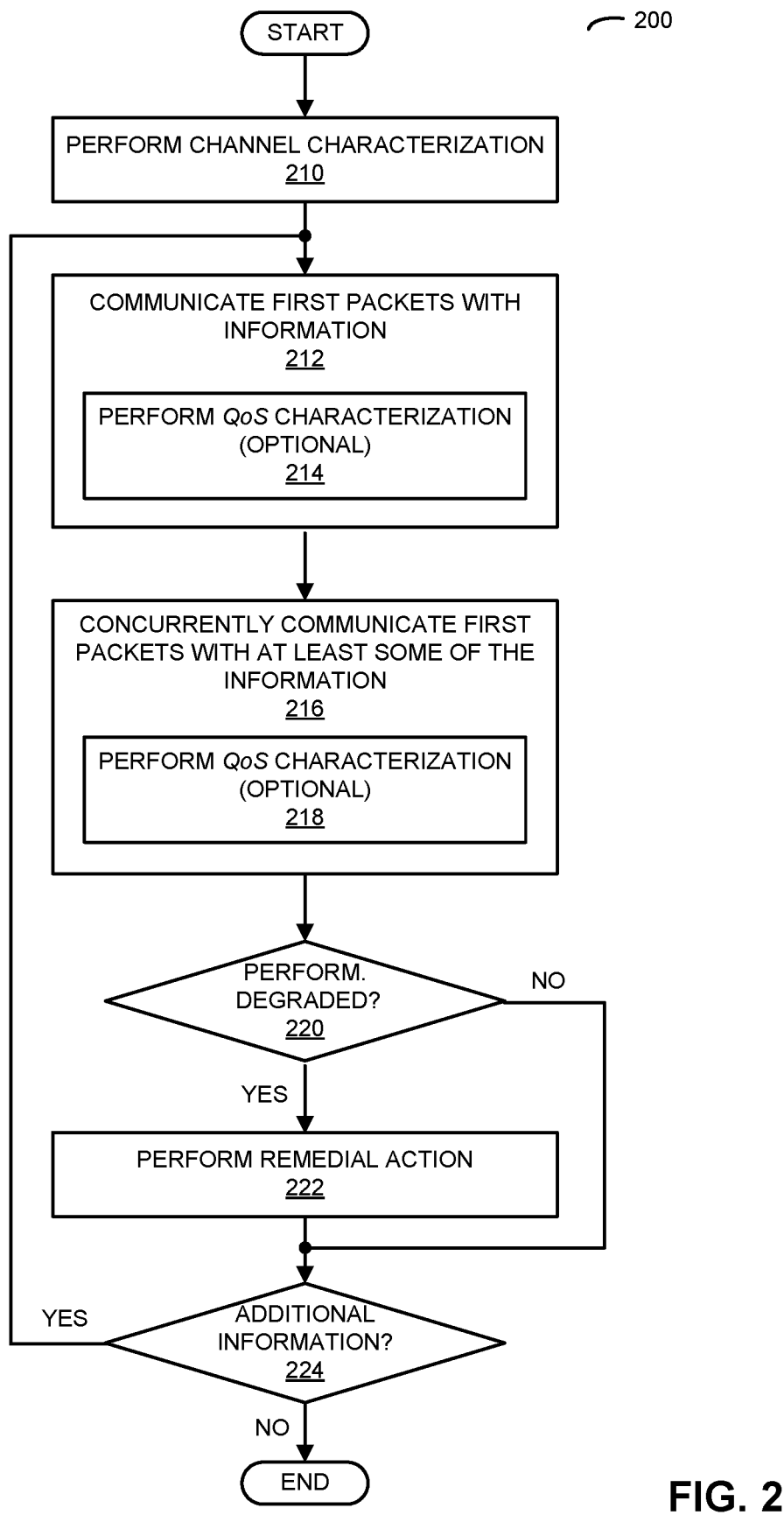
FIG. 2 is a flow diagram illustrating a method for communicating information associated with a data stream among the electronic devices in FIG. 1 in accordance with an embodiment of the present disclosure.

FIG. 2 presents embodiments of a flow diagram illustrating method 200 for communicating information associated with a data stream from a transmitting electronic device to a receiving electronic device, such as transmitting electronic device 110 and receiving electronic device 112-1 (FIG. 1). During operation, the transmitting electronic device performs channel characterization (operation 210) to identify channels to use in subsequent communication. Then, the transmitting electronic device may communicate information or instructions about selected channels that will be subsequently used during communication to the receiving electronic device. In addition, the transmitting electronic device may receive the information associated with the data stream via an input port in the transmitting electronic device.

Moreover, the transmitting electronic device communicates first packets with the information (operation 212) associated with the data stream to the receiving electronic device via a first channel using a first interface circuit (in a first radio) in the transmitting electronic device and a first WLAN communication protocol. Furthermore, the transmitting electronic device concurrently communicates second packets with at least some of the information (operation 216) associated with the data stream (such as at least a majority of the information) to the receiving electronic device via a second channel using a second interface circuit (in a second radio) in the transmitting electronic device and a second WLAN communication protocol.

For example, the first channel may be different than the second channel. However, in other embodiments, the first channel may be the same as the second channel. Moreover, the first interface circuit and the second interface circuit may use the same WLAN communication protocol (i.e., the first WLAN communication protocol may be the same as the second WLAN communication protocol) or different WLAN communication protocols (i.e., the first WLAN communication protocol may be different than the second WLAN communication protocol). Furthermore, in some embodiments the second packets may include the information (i.e., the communication may be fully or 100% redundant) or may only include a portion of the information (i.e., the communication may be partially redundant).

If the transmitting electronic device determines that a performance metric associated with the communication (operation 212 or operation 216) has degraded (operation 220) (or that improved communication via another channel is available), then transmitting electronic device may perform remedial action (operation 222). For example, based on the previously determined channel characterization (operation 210), the transmitting electronic device may transfer the communication (operation 212 or 216) to a different channel that currently has better performance. As noted previously, the transmitting electronic device may provide instructions or may communicate information specifying the different channel to the receiving electronic device. Alternatively or additionally, the transmitting electronic device may compress the communicated information (operation 212 or 216).

Furthermore, during the communication (operation 212 or 216), the transmitting electronic device may optionally perform QoS characterization (operations 214 and/or 218) without disrupting the communication of the information. This QoS characterization may allow the channel characterization to be updated. Alternatively or additionally, the QoS characterization may allow the communication (operation 212 or 216) to be optimized.

Note that method 200 may continue as long as there is additional information to communicate (operation 224).

In these ways, the transmitting electronic device (for example, an interface circuit, a driver and/or software executed in an environment of the transmitting electronic device) may facilitate communication with the one or more receiving electronic devices. In particular, the transmitting electronic device may independently, concurrently and redundantly communicate the information the receiving electronic device to ensure reliable and high-quality communication. This may reduce latency and/or disruptions in service (such as in the display of video on the receiving electronic device) and, thus, may improve the user experience when communicating via the transmitting electronic device.

In some embodiments of method 200 (FIG. 2), there may be additional or fewer operations. Moreover, the order of the operations may be changed, and/or two or more operations may be combined into a single operation.

Furthermore, in some embodiments the transmitting electronic device is designed to: support up to four wireless streams, have a target minimum throughput of at least 35 Mbps per stream (although this value is an illustration and other values may be used), facilitate independent frequency planning, provide robustness in the presence of interference, and/or provide redundant communication. The transmitting electronic device may include four radios. Three of the radios may support one or more Wi-Fi communication protocols and/or may use a multiple-input/multiple-output (MiMo) communication technique (such as a 3×3 configuration) so that spatial diversity and/or beam forming can be used to improve the communication performance. The remaining radio may use Bluetooth.

Table 1 presents radio use cases during communication among the electronic devices in FIG. 1 according to some embodiments. In particular, the three radios may support full redundant communication of the information. For example, with one data stream, radio 2 may redundantly communicate the same information as radio 1 (as denoted by Secondary$_1$ in Table 1). The corresponding available link bandwidths may degrade from 450 Mbps with one data stream, to 157 Mbps with two data streams, to 157 Mbps with three data streams for radios 1 and 2 and 75 Mbps for radio 3, and to 112 Mbps with four data streams for radios 1 and 2 and 75 Mbps for radio 3. Note that the redundant information may be communicated using more than two radios. For example, with limited redundancy capability, the redundant information may be communicated using three radios. In particular, the second and the third radio may communication the redundant information.

TABLE 1

| Data Streams | Radio 1 | Radio 2 | Radio 3 |
|---|---|---|---|
| 1 | $Primary_1$ | $Secondary_1$ | Communication with an access point (AP) |
| 2 | $Primary_1$, $Secondary_2$ | $Primary_2$, $Secondary_1$ | Communication with the AP |
| 3 | $Primary_1$, $Secondary_2$ | $Primary_2$, $Secondary_3$ | $Primary_3$, $Secondary_1$, Communication with the AP |
| 4 | $Primary_1$, $Secondary_2$, $Secondary_4$ | $Primary_2$, $Secondary_3$, $Secondary_4$ | $Primary_3$, $Secondary_1$, Communication with the AP |

In addition, as noted previously, the redundant communication may facilitate QoS characterization of the channels used in the communication and/or the channels associated with a Wi-Fi communication protocol. In particular, during the communication between the transmitting electronic device and the receiving electronic device the QoS characterization may include: channel estimation (such as, for a given channel, estimating a distance to a receiving electronic device and determining an associated phase distortion), link quality, channel calibration (such as determining a transmit power and a phase for the given channel based on the estimated distance to the receiving electronic device and the associated phase distortion), and/or spectral analysis. Channel estimation is illustrated in FIG. 3. In particular, as shown in FIG. 3, a received signal strength indicator (RSSI), and more generally the received energy or power, may be used by transmitting electronic device 110 to provide coarse estimates of the distances to receiving electronic devices 112. For example, based on the estimated distance loss, receiving electronic device 112-2 having an associated RSSI of −50 dBm may be estimated to be closer than receiving electronic device 112-1 having an associated RSSI of −70 dBm, which in turn may be estimated to be closer than receiving electronic device 112-3 having an associated RSSI of −100 dBm.

This channel estimation may be refined using RSSI ranging based on the angle of arrival (AOA), the round trip time (RTT), and/or the time of arrival (TOA) to specify the relative locations (front/back) and the angles to the receiving electronic devices. In particular, the AOA may use phase information from a receiver circuit to estimate the impact of a given channel on the phase. Moreover, the RTT may be based on Request-to-Send (RTS) and Clear-to-Send (CTS) messages, which may allow transmitting electronic device 110 to perform a one-sided calculation of the distance to a given one of receiving electronic devices 112. Alternatively, the TOA may be based on time stamps in the communicated packets, and may involve a cooperative calculation by transmitting electronic device 110 and the given one of receiving electronic devices 112.

Note that the link quality may be determined using Transmission Control Protocol (TCP)/User Datagram Protocol (UDP) ranging. In particular, transmitting electronic device 110 may use Iperf, a network testing tool, to: create TCP and UDP data streams, and then to measure the throughput of a network that carries these data streams to the given one of receiving electronic devices 112.

Furthermore, the spectral analysis may be performed by transmitting electronic device 110 by capturing time-domain signals associated with one or more channels during communication with the given one of receiving electronic devices 112, and then performing a DFT or a FFT. The resulting spectrum or power spectrum distribution may be used to characterize the one or more channels (e.g., to identify a hidden node) and/or to optimize the communication.

In an exemplary embodiment, redundant communication is used preferentially as long as permitted by the conditions in the wireless environment. The transmitting electronic device implementing the communication technique may gracefully degrade the redundant communication as the performance degrades. In this way, the transmitting electronic device may maintain the advantages of the redundant communication as long as possible. For example, the transmitting electronic device may maintain full (or 100%) redundancy as long as the TCP throughput on a link is at least 35 Mbps (which is used as an illustration, i.e., other values of the minimum throughput may be used).

If the transmitting electronic device determines that better throughput can be achieved on a different channel, the transmitting electronic device may seamlessly move to the better channel in order to have the highest throughput channel available with full redundancy. However, in embodiments where there is no other channel available to achieve the minimum throughput or bandwidth requirement, then the transmitting electronic device may modify the communication according to different scenarios.

In particular, as long as the total bandwidth required by one or more data streams (such as video streams) is less than 80% of the current bandwidth, then the transmitting electronic device may maintain full redundancy. For example, if a link bandwidth drops below 35 Mbps (such as to 10 Mbps), but two data streams in total only require 5 Mbps, then the transmitting electronic device may not take any action because the total bandwidth required by the two data streams only requires 50% of the current total bandwidth available.

However, if the total bandwidth required by the active data streams exceeds 80% of the current available bandwidth, the transmitting electronic device may attempt to intelligently compress the data streams so that at least 2 Mbps is reserved for each data stream. For example, if there is a total of 9 Mbps of bandwidth, the transmitting electronic device may try to evenly/intelligently compress the data streams so that each data stream is as far as possible above the 2 Mbps minimum bandwidth required for each data stream. Alternatively, suppose there are three data streams, including: a first data stream that uses 3 Mbps, a second data stream that uses 1.5 Mbps, and a third data stream that uses 7 Mbps. Because the third data stream takes up a significant amount of the bandwidth (well over the minimum 2 Mbps) relative to the other data streams, the transmitting electronic device may attempt to compress the third data stream down to 2.5 Mbps and the first data stream to 2.4 Mbps, while the second data stream may stay at 1.5 Mbps, so that the total bandwidth required by the active data streams is less than 80% of the current available bandwidth.

If, even after compression, the transmitting electronic device cannot transmit the multiple data streams and maintain 80% of the throughput on any channel in the two spectrums, then the transmitting electronic device may begin to drop redundancy on the data streams to maintain a minimum of at least 2 Mbps for each data stream. The transmitting electronic device may alert the end customer (i.e., the user of the transmitting electronic device and/or the receiving electronic device) by displaying on the transmitting electronic device or the receiving electronic device (such as on a television) the communication warning message, which may indicate how the QoS is impacted, that the wireless performance is bad, and/or the remedial action.

At this point, the transmitting electronic device may communicate the data streams in a non-redundant fashion. However, in the absence of the redundant communication, the end customer may experience dropped packets, lost connections, etc.

Figure 4:
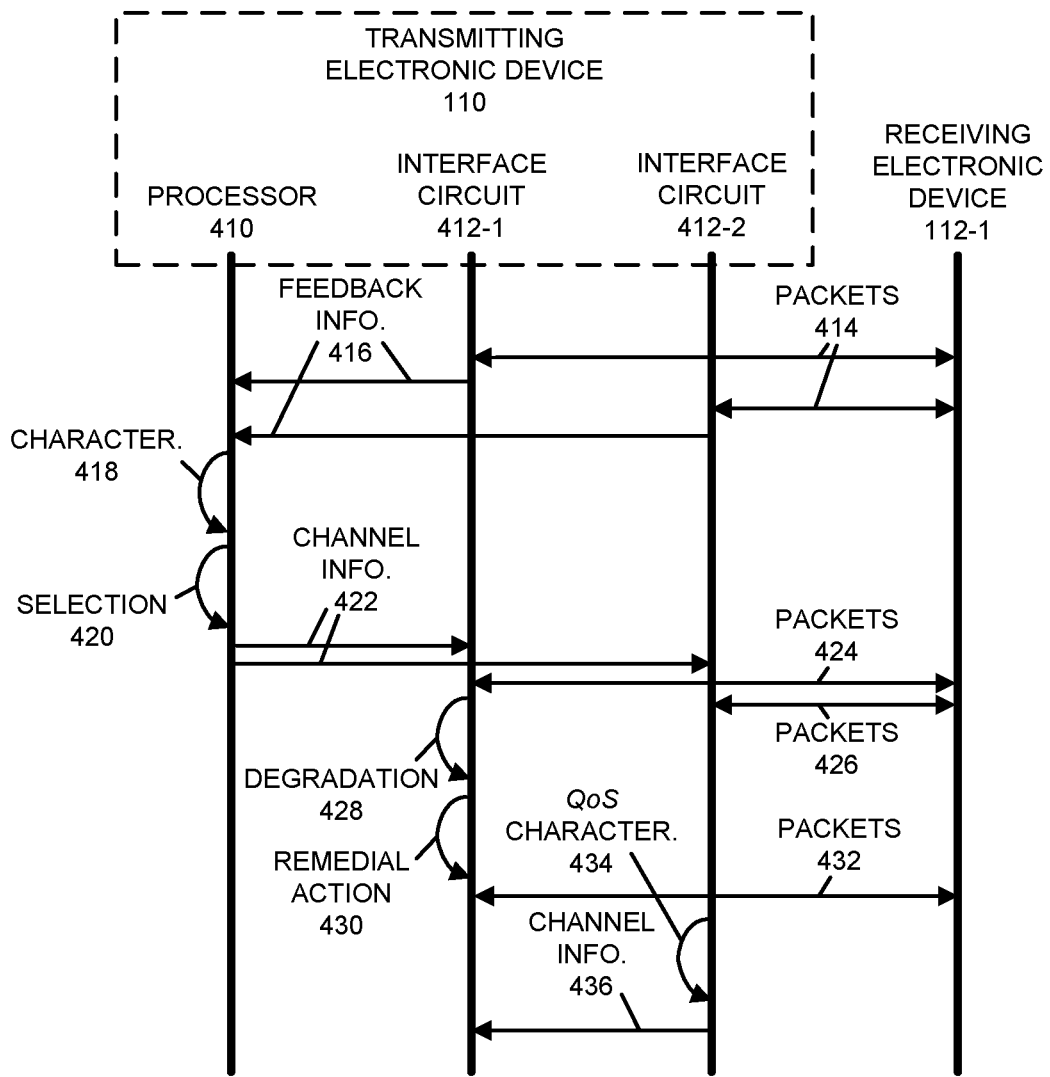
FIG. 4 is a drawing illustrating communication among the electronic devices in FIG. 1 in accordance with an embodiment of the present disclosure.

Embodiments of the communication technique are further illustrated in FIG. 4, which presents a drawing illustrating communication between transmitting electronic device 110 and receiving electronic device 112-1 (FIG. 1). In particular, processor 410 in transmitting electronic device 110 may characterize 418 channels associated with one or more WLAN communication protocols based on feedback information 416 associated with communication of packets 414 by either or both of interface circuits 412 with receiving electronic device 112-1. Then, processor 410 may select 420 one or more channels to use in subsequent communication, and may store channel information 422 in memory in interface circuits 412.

Moreover, interface circuit 412-1 may communicate packets 424 to receiving electronic device 112-1 with information associated with a data stream via a first channel in the selected one or more channels and a first WLAN communication protocol. Furthermore, interface circuit 412-2 may concurrently and independently communicate packets 426 to receiving electronic device 112-1 with at least some of the information associated with the data stream via a second channel in the selected one or more channels and a second WLAN communication protocol.

If one of interface circuits 412 (such as interface circuit 412-1) determines that a performance metric associated with the communication has degraded 428 (or that improved communication via another channel is available), then this interface circuit may perform remedial action 430. For example, interface circuit 412-1 may access the stored channel information, and may select a different channel to use in subsequent communication of packets 432 with receiving electronic device 112-1. Because the communication of packets 424 and 426 may be independent of each other, note that interface circuits 412 can separately and independently of each other handover to another channel (such as the different channel used to communicate packets 432).

Furthermore, during the communication, either or both of interface circuits 412 (such as interface circuit 412-2) may perform QoS characterization without disrupting the communication of the information. For example, interface circuit 412-2 may perform QoS characterization 436 while interface circuit 412-1 communicates packets 432 with the information. This QoS characterization may include: performing channel estimation, determining link quality, performing channel calibration and/or performing spectral analysis. Thus, QoS characterization 434 may update stored channel information 436.

We now describe embodiments of the electronic device. FIG. 5 presents a block diagram illustrating an electronic device 500, such as transmitting electronic device 110 or one of receiving electronic devices 112 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, interface circuits 518 and associated antennas 520. (While FIG. 5 includes antennas 520, in some embodiments electronic device 500 includes one or more nodes, such as nodes 508, e.g., pads, which can be coupled to antennas 520. Thus, electronic device 500 may or may not include antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 518 and at least one of antennas 520 may constitute a radio.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display (such as the communication warning message), which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Moreover, while one of antennas 520 is shown coupled to a given one of interface circuits 518, there may be multiple antennas coupled to the given one of interface circuits 518. For example, an instance of a 3×3 radio may include three antennas. Additionally, one or more of the subsystems may not be present in electronic device 500. Furthermore, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program instructions 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as one or more radios. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios.

In some embodiments, networking subsystem 514 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, while not shown in FIG. 5, networking subsystem 514 may include at least one input port to receive the information in the data stream.

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 522, operating system 524 (such as drivers for interface circuits 518) and/or in firmware in interface circuits 518. Alternatively or additionally, at least some of the operations in the communication technique may be implemented in a physical layer, such as hardware in interface circuits 518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
an input port configured to receive information associated with a data stream;
a first interface circuit, configured to couple to a first antenna, and configured to communicate first frames including the information associated with the data stream from the integrated circuit addressed to a receiving electronic device via a first channel using a wireless-local-area-network (WLAN) communication protocol; and
a second interface circuit, configured to couple to the second antenna, and configured to communicate second frames including the information associated with the data stream from the integrated circuit addressed to the receiving electronic device via a second channel using the WLAN communication protocol, wherein the second channel is different than the first channel;

wherein the second frames are communicated from the integrated circuit addressed to the receiving electronic device concurrently with the first frames; and wherein the integrated circuit is configured to provide an instruction addressed to the receiving electronic device to use the first channel during the communication of the first frames and to use the second channel during the communication of the second frames.

2. The integrated circuit of claim 1, wherein the WLAN communication protocol is compatible with an Institute of Electrical and Electronics Engineers (IEEE) 802.11 standard.

3. The integrated circuit of claim 1, wherein the communication of the first frames via the first channel is independent of the communication of the second frames via the second channel.

4. The integrated circuit of claim 1, wherein the first interface circuit is configured to transfer communication of the first frames to a third channel when one of: a connection with the receiving electronic device associated with the first channel is lost, a performance metric associated with the communication via the first channel degrades below a threshold value, or a performance metric associated with communication via the third channel exceeds the performance metric associated with communication via the first channel;

wherein the second interface circuit is configured to transfer communication of the second frames to a fourth channel when one of: a connection with the receiving electronic device associated with the second channel is lost, a performance metric associated with the communication via the second channel degrades below a threshold value, or a performance metric associated with communication via the fourth channel exceeds a performance metric associated with communication via the second channel;

wherein the concurrent communication of the first frames and the second frames ensures the information, addressed to the receiving electronic device, is communicated without disruption during the transfer to one of the third channel or the fourth channel; and wherein the integrated circuit is configured to provide an instruction addressed to the receiving electronic device to perform one of: transferring the communication of the first frames from the first channel to the third channel; or transferring the communication of the second frames from the second channel to the fourth channel.

5. The integrated circuit of claim 1, wherein, when one of a connection with the receiving electronic device associated with the first channel is lost or a connection with the receiving electronic device associated with the second channel is lost, the communication of one of the first frames and the second frames ensures the information, addressed to the receiving electronic device, is communicated without disruption and without further action by the integrated circuit.

6. The integrated circuit of claim 1, wherein the integrated circuit is configured to compress at least one of the information included in the first frames or the information included in the second frames when one of: a performance metric associated with the communication via the first channel degrades below a first threshold value; or a performance metric associated with the communication via the second channel degrades below a second threshold value; and wherein the compression maintains approximately a common margin in the performance metric associated with the communication via the first channel and in the performance metric associated with the communication via the second channel.

7. The integrated circuit of claim 1, wherein the integrated circuit is configured to provide a communication warning message and to selectively discontinue the redundant communication of the information via the first frames and the second frames when at least one of: a performance metric associated with the communication via the first channel is below a first threshold value; or a performance metric associated with the communication via the second channel is below a second threshold value.

8. The integrated circuit of claim 1, wherein the integrated circuit is configured to jointly encode the first frames and the second frames to provide one of information gain or error correction based on the concurrent communication.

9. The integrated circuit of claim 1, wherein the integrated circuit is configured to detect dropouts in at least one of the first frames or the second frames based on the concurrent communication.

10. The integrated circuit of claim 1, wherein, during the communication of the information, the integrated circuit is configured to determine, without disrupting the communication of the information, one of: for a given channel, a distance to a receiving electronic device and an associated phase distortion; or channel calibration associated with one of the first channel or the second channel.

11. The integrated circuit of claim 1, wherein, during the communication of the information, the integrated circuit is configured to dynamically perform spectral analysis of channels associated with the WLAN communication protocol using one of the first interface circuit or the second interface circuit without disrupting the communication of the information; and wherein the dynamic spectral analysis involves capturing time-domain signals associated with at least a given channel during the communication and performing a Fourier transform or a discrete Fourier transform to determine a spectrum or a power spectrum distribution.

12. A non-transitory computer-readable storage medium for use in conjunction with an integrated circuit, the computer-readable storage medium storing program instructions, wherein, when executed by the integrated circuit, the program instructions cause the integrated circuit to perform operations comprising:

providing an instruction addressed to a receiving electronic device to use a first channel during communication of first frames and to use a second channel during the communication of second frames;

receiving information associated with a data stream via an input port in the integrated circuit;

communicating the first frames from the integrated circuit addressed to the receiving electronic device with the information associated with the data stream via the first channel using a first interface circuit in the integrated circuit and a wireless-local-area-network (WLAN) communication protocol; and communicating from the integrated circuit addressed to the receiving electronic device the second frames with the information associated with the data stream via the second channel using a second interface circuit in the integrated circuit and the WLAN communication protocol, wherein the second channel is different than the first channel;

wherein the second frames are communicated from the integrated circuit addressed to the receiving electronic device concurrently with the first frames.

13. The non-transitory computer-readable storage medium of claim 12, wherein the WLAN communication protocol is compatible with an Institute of Electrical and Electronics Engineers (IEEE) 802.11 standard.

14. The non-transitory computer-readable storage medium of claim 12, wherein the communication of the first frames via the first channel is independent of the communication of the second frames via the second channel.

15. The non-transitory computer-readable storage medium of claim 12, wherein the operations comprise:
transferring communication of the first frames to a third channel when one of: a connection with the receiving electronic device associated with the first channel is lost, a performance metric associated with the communication via the first channel degrades below a first threshold value, or a performance metric associated with communication via the third channel exceeds the performance metric associated with communication via the first channel;
transferring communication of the second frames to a fourth channel when one of: a connection with the receiving electronic device associated with the second channel is lost, a performance metric associated with the communication via the second channel degrades below a second threshold value, or a performance metric associated with communication via the fourth channel exceeds the performance metric associated with communication via the second channel, wherein the concurrent communication of the first frames and the second frames ensures the information, addressed to the receiving electronic device, is communicated without disruption during the transfer to one of the third channel or the fourth channel; and
providing an instruction addressed to the receiving electronic device to perform one of: transferring the communication of the first frames from the first channel to the third channel; or transferring the communication of the second frames from the second channel to the fourth channel.

16. The non-transitory computer-readable storage medium of claim 12, wherein the operations comprise jointly encoding the first frames and the second frames to provide one of information gain or error correction based on the concurrent communication.

17. The non-transitory computer-readable storage medium of claim 12, wherein, when one of a connection with the receiving electronic device associated with the first channel is lost or a connection with the receiving electronic device associated with the second channel is lost, the communication of one of the first frames or the second frames ensures the information, addressed to the receiving electronic device, is communicated without disruption and without further action by the integrated circuit.

18. The non-transitory computer-readable storage medium of claim 12, wherein the operations comprise determining, during the communication, and without disrupting the communication of the information, one of: for a given channel, a distance to a receiving electronic device and an associated phase distortion; or channel calibration associated with one of the first channel and the second channel.

19. The non-transitory computer-readable storage medium of claim 12, wherein the operations comprise dynamically performing, during the communication, spectral analysis of channels associated with the WLAN communication protocol using one of the first interface circuit or the second interface circuit without disrupting the communication of the information; and
wherein the dynamic spectral analysis involves capturing time-domain signals associated with at least a given channel during the communication and performing a Fourier transform or a discrete Fourier transform to determine a spectrum or a power spectrum distribution.

20. A method for communicating information associated with a data stream from an integrated circuit addressed to a receiving electronic device, wherein the method comprises:
by the integrated circuit:
providing an instruction addressed to the receiving electronic device to use a first channel during communication of first frames and to use a second channel during the communication of second frames;
receiving the information associated with the data stream via an input port in the integrated circuit;
communicating the first frames from the integrated circuit addressed to the receiving electronic device with the information associated with the data stream via the first channel using a first interface circuit in the integrated circuit and a wireless-local-area-network (WLAN) communication protocol; and
communicating the second frames from the integrated circuit addressed to the receiving electronic device with the information associated with the data stream via the second channel using a second interface circuit in the integrated circuit and the WLAN communication protocol, wherein the second channel is different than the first channel; and
wherein the second frames are communicated from the integrated circuit addressed to the receiving electronic device concurrently with the first frames.

* * * * *